UNITED STATES PATENT OFFICE.

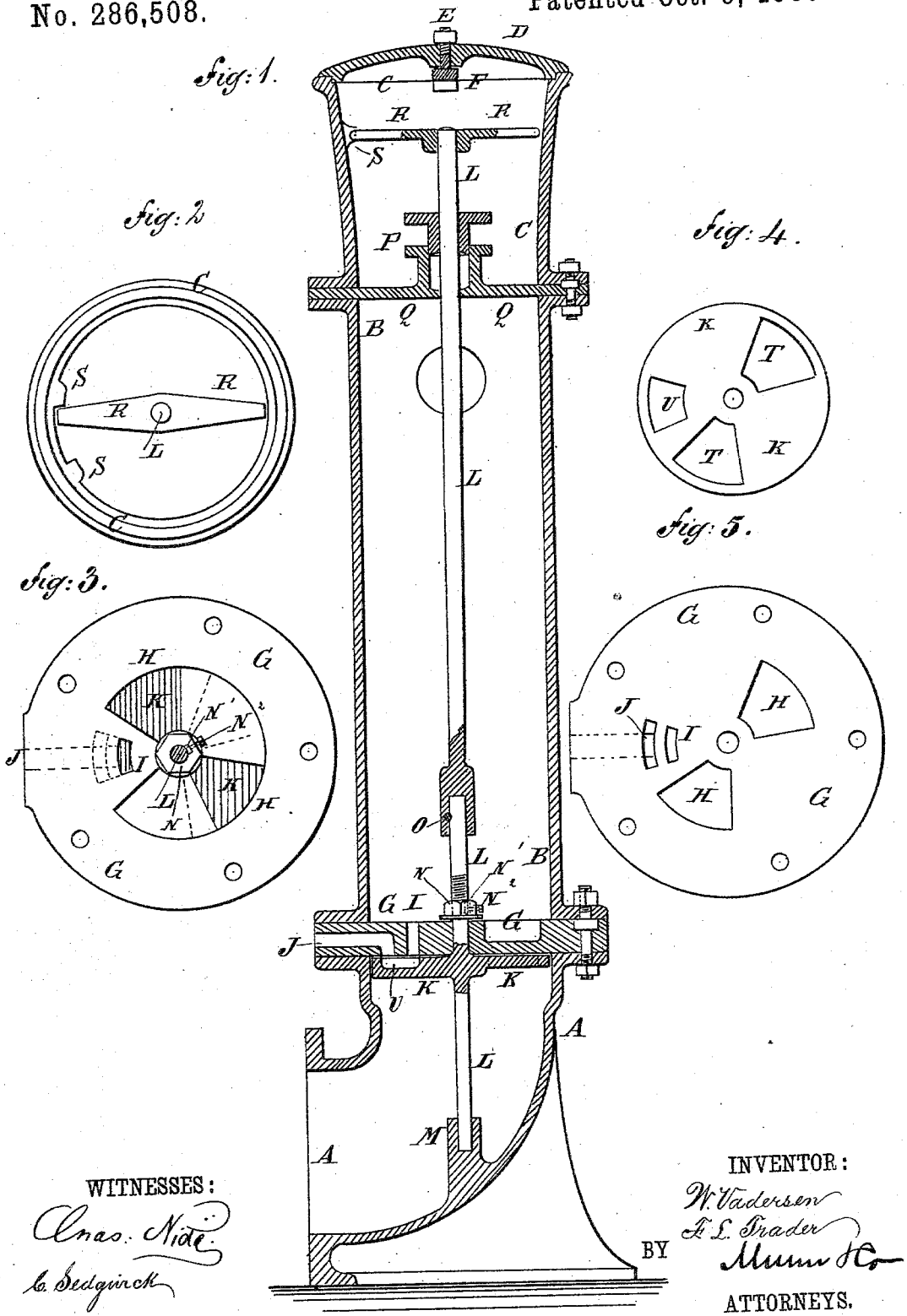

WILLIAM VADERSEN AND FRANK L. TRÄDER, OF ELIZABETH, N. J.

HYDRANT.

SPECIFICATION forming part of Letters Patent No. 286,508, dated October 9, 1883.

Application filed April 2, 1883. (No model.)

*To all whom it may concern:*

Be it known that we, WILLIAM VADERSEN and FRANK L. TRÄDER, both of Elizabeth, in the county of Union and State of New Jersey, have invented a new and useful Improvement in Hydrants, of which the following is a full, clear, and exact description.

Reference is to be had to the accompanying drawings, forming a part of this specification, in which similar letters of reference indicate corresponding parts in all the figures.

Figure 1 is a sectional side elevation of our improvement. Fig. 2 is a plan view of the same, the cover being removed. Fig. 3 is a plan view of the valve-plate and valve. Fig. 4 is a plan view of the valve. Fig. 5 is an under side view of the valve-plate.

The object of this invention is to prevent the freezing of water in hydrants.

To this end our invention consists in a valve-plate of peculiar construction adapted to be interposed between two sections of the hydrant, and in a valve of peculiar form and peculiarly stepped, as hereinafter shown and described.

The body or stock of the hydrant is made in three parts, A B C, the adjacent ends of which are flanged to receive the connecting-bolts. The upper end of the part C is provided with a cover, D, secured in place by a bolt, E, attached to a cross-bar, F, or by other suitable means. The lower end of the part A is secured to the water-pipe in the ordinary manner.

Between the adjacent ends of the parts A B of the hydrant is secured the valve-plate G, through which are formed two large inlet-ports, H, and a small outlet-port, I. In the valve-plate G is also formed a passage, J, leading from the lower side of the said plate, at a little distance from the outlet-port, I, out through the outer edge of the said plate G.

Against the lower side of the plate G is fitted the valve K, the lower end of the stem L of which rests in the socket M, formed in the lower part A of the stock. The valve K is held up to its seat by a nut, N, screwed upon the stem L at the upper side of the valve-plate G. The nut N is locked in place and kept from being loosened by the friction caused by opening and closing the valve K by the block N', inserted in a groove in the inner surface of the nut N. Upon the inner surface of the block N' is formed a screw-thread corresponding with the screw-thread of the nut N, so that the nut N and block N' move together when screwing the said nut down and up. When the nut N has been screwed firmly against the valve-plate G, the block N' is forced inward against the screw-thread of the valve-stem L by a set-screw, N², passing in through the side of the nut N. The plate G, with its valve K, forms a complete valve, that may be quickly interposed between the flanged ends of any hydrant, the outlet J in the edge of the plate preventing the necessity of making any holes in the hydrant-pipe as a safety-outlet. By this means valves may be quickly taken out and replaced by others, so that a valve without the outlet J could be used in summer time, and one with the outlet substituted in winter. The step M is not a positive necessity to the working of the valve, and where this valve is to be placed in pipes not originally designed for it the lower portion of stem L may be dispensed with; but the step M assists in preserving the valve properly seated, and we prefer to use it to complete our invention. For convenience, the valve-stem L is made in two parts, the upper end of the lower part entering a socket in the lower end of the upper part, and being secured in place by a locking-pin, O, as shown in Fig. 1. The upper part of the valve-stem L passes through a stuffing-box, P, in the plate or partition Q, secured between the adjacent ends of the parts B C of the hydrant.

To the upper end of the valve-stem L is attached a cross-head, R, to serve as a handle in opening and closing the valve K. One end of the cross-head R moves between two projections, S, formed upon the inner surface of the upper part, C, of the hydrant, and which serve as stops to limit the movement of the valve-stem L and the valve K, and as a gage to show in what position the said valve may be. The valve K is provided with two inlet-ports, T, corresponding in shape and size with the inlet-ports H of the valve-plate G. The valve K is also provided with a recess, U. The ports T and the recess U of the valve K are so arranged that when the ports T are under the ports H of the valve-plate G the recess U will be covered, and when the recess U is under the port I of the said valve-plate G the ports T will be closed. With this construction, when the ports T are open, the water will flow into the hydrant freely, and when the ports T are closed the water in the hydrant will flow out through the port I, the recess U, and the passage J, so that no water will be left in the hydrant to freeze and burst the said hydrant or prevent its working.

Having thus fully described our invention, we claim as new and desire to secure by Letters Patent—

1. The valve-plate G, having openings through it and an opening, J, extending from the valve-seat through the edge of the plate to open air, said plate being fitted to be held between the flanged ends of a hydrant, as described.

2. The combination, with the plate G, of the valve K, the stem L, attached thereto, the screw-nut N on the stem, and the stem-step M, as shown, and for the purpose set forth.

WILLIAM VADERSEN.
FRANK. L. TRÄDER.

Witnesses:
T. L. HOUGH,
WM. A. M. MACK.